United States Patent
Rad et al.

(10) Patent No.: US 8,328,948 B2
(45) Date of Patent: Dec. 11, 2012

(54) PURIFICATION OF RAW JUICE FEATURING REDUCED LIME CONSUMPTION

(75) Inventors: Mohsen Ajdari Rad, Obrigheim (DE); Stefan Frenzel, Weinheim (DE); Azar Shahidizenouz, Obrigheim (DE)

(73) Assignee: Sudzucker Aktiengesellschaft Mannheim/Ochsenfurt, Mannheim (DE)

( * ) Notice: Subject to any disclaimer, the term of this patent is extended or adjusted under 35 U.S.C. 154(b) by 628 days.

(21) Appl. No.: 12/162,411

(22) PCT Filed: Jan. 26, 2007

(86) PCT No.: PCT/EP2007/000671
§ 371 (c)(1),
(2), (4) Date: Jul. 28, 2008

(87) PCT Pub. No.: WO2007/085466
PCT Pub. Date: Aug. 2, 2007

(65) Prior Publication Data
US 2009/0007902 A1    Jan. 8, 2009

(30) Foreign Application Priority Data
Jan. 28, 2006 (DE) .................. 10 2006 004 103

(51) Int. Cl.
*C13B 20/00* (2006.01)
(52) U.S. Cl. ............. 127/50; 127/46.1; 127/53; 127/57; 127/58
(58) Field of Classification Search .................. 127/50, 127/63.1, 53, 57, 58, 48, 42
See application file for complete search history.

(56) References Cited

U.S. PATENT DOCUMENTS

| 2,071,776 | A | | 2/1937 | Teatini | |
| 2,477,206 | A | * | 7/1949 | Rinehart | 127/50 |
| 2,679,464 | A | * | 5/1954 | Moore | 127/50 |
| 3,089,789 | A | | 5/1963 | Van Note | |
| 3,542,591 | A | * | 11/1970 | Berndt et al. | 127/51 |
| 4,795,494 | A | | 1/1989 | Toth et al. | |
| 5,480,490 | A | | 1/1996 | Toth et al. | |
| 5,928,429 | A | * | 7/1999 | Duncan et al. | 127/48 |
| 2003/0094416 | A1 | * | 5/2003 | Heikkila et al. | 210/659 |
| 2003/0196653 | A1 | * | 10/2003 | Sanders | 127/50 |
| 2008/0017187 | A1 | | 1/2008 | Deneus et al. | |

FOREIGN PATENT DOCUMENTS

| AT | 145083 A1 | 3/1936 |
| DE | 600 07 585 T2 | 11/2004 |
| DE | 103 50 672 A1 | 6/2005 |
| EP | 1 063 303 A1 | 12/2000 |
| WO | WO 2005042787 A1 * | 5/2005 |

OTHER PUBLICATIONS

Bernd Frommelt "Experiences of juice purification in beet sugar factories, A comparison of Klein Wanzleben, Germany, and Moorhead, USA", Int. Sugar Jnl, 1997, vol. 99, No. 1183B, pp. 328-332.

* cited by examiner

*Primary Examiner* — Tony G Soohoo
*Assistant Examiner* — David C Mellon
(74) *Attorney, Agent, or Firm* — Dickstein Shapiro LLP (57) ABSTRACT

The present invention relates to an improved method for the purification of crude sugar beet juice. The present invention relates moreover to methods for the manufacture of non-sucrose substance combinations from crude sugar beet juice, as well as two devices for the purification of crude sugar beet juice. The measures according to the invention allow a reduction of lime consumption during the purification.

18 Claims, 3 Drawing Sheets

PURIFICATION OF RAW JUICE FEATURING REDUCED LIME CONSUMPTION

The present invention relates to an improved method for the purification of crude sugar beet juice, which is produced primarily by extraction from sugar beets. The present invention also relates to a method for the manufacture of non-sucrose substance compositions made of crude sugar beet juice, as well as to devices for the purification of crude sugar beet juice. The measures according to the invention allow a reduction of lime consumption during the purification.

Conventionally, sugar is obtained from beets (sugar beets, *Beta vulgaris*) by first removing most of the still adhering soil, as well as leaf residues from the harvested beets. Then, the beets are washed and planed with cutting machines to—for the most part—pencil-thick chips. Sugar extraction from the chips is then carried out in general by extracting the beet chips in hot extraction water. As a rule, a countercurrent extraction in an extraction tower is carried out. Acidifying the extraction water promotes the subsequent filtration of the obtained crude sugar beet juice and the pressability of the extracted chips.

The crude sugar beet juice obtained in the extraction is then led to a purification step, also called extract purification. The latter is carried out primarily to remove contaminants, called non-sucrose substances, contained in the crude juice. The presence of non-sucrose substances worsens the production result, i.e., the crystalline sucrose, respectively the sucrose syrup, obtained from the concentrating the crude juice and the subsequent crystallization.

Usually, extract purification is carried out by the so-called lime-carbonic acid extract purification. The latter comprises the process steps of preliming and mainliming. Then, a first and optionally second carbonation takes place, where the precipitate formed during the carbonation is separated by filtration from the clarified crude juice. Ideally, in the preliming and mainliming, the non-sucrose substances contained in the crude sugar beet juice are degraded and split off only to the extent that still allows their separation by means of advantageous separation methods. However, if the non-sucrose substances are degraded to low molecular weight compounds, and if the latter can no longer be removed completely from the crude juice, the final product is worsened.

In the known preliming, the crude sugar beet juice is alkalinized under mild conditions stepwise by the addition of calcium hydroxide solution, so-called lime milk. In the process, the pH of the crude sugar beet juice is increased in the preliming reactor stepwise to approximately pH 11.5. A known preliming occurs under the addition of lime milk, up to a concentration of approximately 0.1-0.3 g calcium hydroxide per 100 mL crude sugar beet juice (g CaO/100 mL). Due to the alkalinization of the crude juice, a neutralization of the organic and inorganic acids contained in the extract occurs. In the process, anions that form insoluble or sparingly soluble salts with the calcium, for example, phosphate, oxalate, citrate, and sulfate, are largely precipitated. In addition, proteins, as well as colloidally dissolved non-sucrose substances, such as pectin and proteins, coagulate. The precipitation of the non-sucrose substances occurs within certain pH ranges through which the alkalinization passes as it progresses. In the process, a compaction or consolidation of the precipitate obtained also occurs, allowing easier removal.

The mainliming, which is carried out subsequently, leads primarily to the chemical degradation of invert sugar and of acid amides, such as glutamine, contained in the crude juice. These components have to be separated or degraded in an early phase of sucrose preparation. Otherwise, the disadvantageous formation of acids may occur in the subsequent juice concentration. In the known mainliming, the temperature is raised to approximately 85° C. The alkalinity of the crude juice is increased again by the further addition of lime milk, so that a concentration of approximately 0.8-1.1 g CaO/100 mL is reached.

In order to keep the residence time in the mainliming within a range justifiable from the point of view of application technology to generally less than 40 min, the goals of the mainliming can be reached by the known methods only under the above-mentioned extreme condition, i.e., high temperature and high alkalinity.

Calcium not consumed during the mainliming process reacts, by the introduction of carbon dioxide, as so-called carbonation gas, to calcium carbonate in the carbonation step. Calcium carbonate is a strong adsorption agent for a number of soluble non-sucrose substances. Calcium carbonate thus also serves as a filtration aid. However, the proportion of calcium carbonate produced in the known method leads to the addition of filters connected after the carbonation, which results in a reduction of their useful life.

Because of the high amount of lime in the mainliming, an accordingly high amount of carbon dioxide must be used for neutralization in the carbonation. Both carbon dioxide and unslaked lime for the preparation of the lime milk are produced as a rule in coking furnaces, where mineral coal (coke) is combusted together with chalk. Here, the escape of carbon dioxide into the environment, in the coking furnaces and during the carbonation, is unavoidable.

The calcium carbonate sludges (so-called sludge juice concentrates) concentrated via the filters in the first and second carbonation step are usually purified, and pressed using membrane filter presses. In the process, so-called lime phenate is formed. This carbide lime is a storable product with a dry matter content of, as a rule, more than 70%, and it can be used in part as fertilizer. Usually, a portion of the sludge juice concentrate is returned to the preliming.

The crude juice purified in the extract purification, which is also called thin juice, contains approximately 15-17% sucrose. It is then concentrated by water removal to a thick juice with a sucrose content of approximately 65-70%, and then concentrated more in crystallizers until a viscous composition, the so-called cooking composition, with approximately 85% sucrose forms. By removing molasses by centrifugation, one obtains, in the end, crystalline white sugar, which can then be refined optionally.

A drawback of the conventional lime-carbonic acid extract purification consists primarily in that an insufficient cleaning effect is achieved, because only a maximum of approximately 40% of all the non-sucrose substances can be removed from the crude sugar beet juice.

Another disadvantage is that the known extract purification methods require very large quantities of lime. The consumed quantity of lime is approximately 2.5% of the total weight of the processed sugar beets (in case of a daily throughput of approximately 10,000 t sugar beets in a "sugar factory" this means a lime consumption of 250 t per day). Therefore, the manufacture of the known lime used in the known lime-carbonic acid extraction method and the elimination of the waste generated in the manufacture of quick lime are complicated and expensive. In addition, the lime furnaces are subjected to great stress in the high coke conversion, and, in many existing installations, they can be operated only at low efficiency. Another drawback is the great stress placed on the brick lining of the lime furnaces.

At the same time, the emission of the greenhouse gas carbon dioxide from the lime furnaces and the juice purification installation is high. Because the carbon dioxide originates from a fossil fuel, respectively mineral, source, there is environmental pollution.

In addition, the high lime level in the known extraction purification subjects the filter installation of the carbonation steps to great stress and leads to undesired short filter useful lives. In addition, the carbide lime generated in the known extraction purification methods can be further processed only to a limited extent.

Therefore, it is desirable to lower the lime consumption during both preliming and mainliming of the crude sugar beet juice. Here, the effectiveness of the extracted purification should be improved further, or at least maintained.

In known lime-carbonic acid extraction purification methods, the calcium carbonate formed functions as filtration agent. If the lime milk addition is lowered, not only the purification result is worsened, but the filterability of the crude juice after the carbonation also suffers.

The present invention is based on the technical problem of providing an alternative and improved method for the purification of crude sugar beet juice, where above all the lime use is reduced.

The present invention solves the underlying technical problem here substantially by providing a method for the purification of crude sugar beet juice that contains at least the following process steps:

In a first step (a), the crude sugar beet juice is subjected to a preliming. The preliming takes place preferably with the addition of lime milk, which is added up to a concentration of 0.1-0.3 g CaO/100 mL, preferably up to a concentration of 0.2 g CaO/100 mL. In this way, a prelimed crude juice is obtained. It is preferred that, in step (a), the preliming is carried out as a "cold preliming" at low temperature, i.e., at a temperature of 75° C. or less, preferably in a temperature range of 35-65° C.

After the first mainliming in step (b) and preferably before the or during the clarification of the limed crude juice in step (c) to improve the non-sucrose substance fraction in the sludge, it is preferred to add at least a flocculation agent. It is preferred for the flocculation agent to be added up to a concentration of 1-8 ppm. The flocculation agent is chosen preferably from polyanionic macromolecules, polyanionic polysaccharides, preferably from acrylamides and copolymers made of acrylamide and sodium acrylate; the flocculation agent preferably presents an average molecular weight of approximately $5\times10^6$ to $22\times10^6$ g/mol. It is particularly preferred to use flocculation agents based on polysaccharides, particularly derivatized, particularly alkylated starches, and derivatized, particularly alkylated, cellulose. In a preferred variant, carboxymethylcelluloses and/or carboxymethyl starches, preferably in a highly methylated form, are used. In additional variants, mixtures or combinations of the above-mentioned flocculation agents are used. The invention also relates, accordingly, to a method for crude juice purification, in which the above-mentioned flocculation agents are used for the improved clarification of the limed crude juice, particularly during the residence in the separation device. A method according to the invention for the purification of crude sugar beet juice comprises at least steps (a) and (d), where, for the clarification of the crude juice, at least one flocculation agent is added, chosen from, preferably highly carboxymethylated, carboxymethyl starches, carboxymethylcelluloses, and mixtures thereof.

It is particularly preferred to use for the crude juice purification a highly carboxymethylated starch with a substitution degree of 0.6 or more, preferably 0.6-0.7. The maximum substitution degree is particularly 1.5.

For the manufacture of the highly carboxymethylated starches, starch, chosen from potato, corn, waxy corn and amylopectin potato starch or mixtures thereof, particularly potato starch, is used. Said starch is carboxymethylated in a known way. The invention relates preferably to carboxymethylation of the starch, particularly potato starch, in the paste with sodium monochloroacetate (NaClOAc: $Cl-CH_2-COO^-Na^+$) under alkaline conditions. Using a two-step carboxymethylation, the high substitution degree of the product and also an improved conversion are achieved.

In the subsequent, preferably immediately following, step (b), a first mainliming of the prelimed crude juice (preliming juice) occurs. For this purpose, more lime milk is preferably added to the preliming juice up to a concentration of 0.3-0.5 g CaO/100 mL, preferably of 0.4 g CaO/100 mL. In this way, a limed crude juice is obtained. It is preferred to carry out, in step (b), the first mainliming as a "cold mainliming" at low temperature, i.e., at a temperature of 75° C. or less, preferably in a temperature range of 35-65° C.

In the subsequent, preferably immediately following, step (c), the limed crude juice is clarified in a first separation device. This step is carried out by the separation of a fraction substantially containing the non-sucrose substances, where a clarified, i.e., clear, limed crude juice is obtained. In this connection, the term "clarification," respectively "clarified" refers to the process of the separation of the flocculated non-sucrose substance-containing fraction from the crude juice, so that a clarified, optically clear, crude juice is obtained, from which suspended substances and flocculated substances are essentially removed.

The residence time of the limed crude juice in step (c) in the first separation device is preferably at least 40 min or more, preferably at least 60 min or more. In an additional preferred variant, the residence time in the first separation device is 40-60 min. It is preferred for the temperature in step (c) to be at least 70° C. or higher, preferably at least 75° C. or higher. In a preferred variant, the temperature is 75-85° C.

It is preferred to reach the increased temperature by the previous connection of a heat exchanger or continuous flow heater, through which limed crude juice flows. Step (c) is accordingly subdivided preferably into a first step (c1), heating of the limed crude juice, and a second step (c2), a residence in the first separation device, so that the crude juice is separated from a fraction made of non-sucrose substances, and clarified crude juice is obtained.

In an additional subsequent, preferably immediately following, step (d), a second mainliming of the clear limed crude juice occurs. In step (d), more lime milk is added preferably, up to a concentration of 0.4-0.7 g CaO/100 mL, preferably of 0.4 CaO/100 mL.

The first and second mainliming are characterized in that the prelimed crude juice, which presents an alkalinity in the amount of 0.1-0.3 g CaO/100 mL according to the invention, is alkalinized further. For this purpose, more alkalinity is added in the form of lime milk. If the crude juice in the preliming is alkalinized up to a concentration of, for example, 0.1 g CaO/100 mL, then, in the first mainliming according to the invention, an additional addition of lime milk occurs, so that a (final) concentration of preferably 0.3-0.5 g CaO/100 mL is reached. If, on the other hand, the preliming has already been carried out up to a concentration of 0.3 g CaO/100 mL, then lime milk is added again in the first mainliming, so that a concentration of more than 0.3 g CaO/100 mL to preferably at most 0.5 CaO/100 mL is reached.

The second mainliming is carried out preferably as a "hot mainliming" at high temperature. Here, the temperature in step (d) is 70° C. or higher, preferably 75° C. or higher. In a preferred variant, the temperature is 75-95° C., preferably 85° C.

It is preferred for the elevated temperature in the second mainliming to be reached by downstream connection of the heat exchanger or continuous flow heater, through which clarified crude juice flows. Step (d) is subdivided accordingly preferably into a first step (d1), heating of the clarified crude juice, and a second step (d2), the second hot mainliming of the clarified crude juice.

Thus, the invention provides for the preliming to be followed by a first mainliming, where the crude juice is transferred into a (first) separation device. It is only after a certain residence time in the separation device, preferably in the presence of flocculation agents, that a second mainliming is carried out.

The inventors found surprisingly that by using a (first) separation device, which is connected after a first mainliming, the effectiveness of the separation and of the splitting off of non-sucrose substances during the mainliming can be improved. As a result of this surprising increase in the effectiveness of the mainliming effect, the lime milk addition in the mainliming can be reduced. In comparison to known extract purification methods, the so-called mainliming step is also subdivided into three partial steps: First mainliming, residence in a (first) separation device, and second mainliming. This achieves above all that the residence time of the crude sugar beet juice in the mainliming step is increased. According to the invention, above all in the (first) separation device, both the separation of a fraction of non-sucrose substances, and also simultaneously processes whose occurrence with the mainliming is desirable, such as degradation of additional non-sucrose substances, are achieved.

It was found surprisingly that, for example, there is an increase in the saponification of amides, such as glutamine, which are contained disadvantageously in the crude juice, during the mainliming phase, which is expanded according to the invention. In known extract purification methods, which work with a mainliming alkalinity of approximately 0.8 g CaO/100 mL at a mainliming temperature of 85° C. and a mainliming time of 20 min, approximately 90% of the glutamine present in the crude juice can be saponified. It has been found surprisingly that by using the procedure according to the invention the required amide saponification level of 90% can be reached already at a mainliming alkalinity of 0.4 g CaO/100 mL. Accordingly, the total lime consumption is reduced advantageously in the method according to the invention by approximately 40% compared to known extract purification methods, while, at the same time, the quality either remains the same or is improved with regard to the thin juice obtained, for example, the clarified crude juice.

As a result of the more effective mainliming, a clarified crude juice of increased quality is obtained, and, optionally, a secondary calcification of the crude juice after the first carbonation step can be omitted. In addition, the method according to the invention is also suited advantageously for the processing of beet material of poorer quality, for example, older beets. This means above all that the campaign time, i.e., the time during which the harvested and intermediately stored beets can be processed in the sugar plant, can be increased. The advantageous result is a reduction of coke consumption, less stress on the lime furnaces, which can now be operated with increased effectiveness, increased yield, a high soft burned proportion, less stress on the brick lining, and a reduction of the environmentally damaging carbon dioxide emissions.

Moreover, the reduction according to the invention in lime addition results in lowering the load on the filtration steps during the carbonation, and an increase in the useful lives of filters, because less calcium carbonate is produced. As a result, the occurrence of sludge juice concentrate as well as carbide lime is also reduced, which leads to a reduction of the load on the so-called carbide lime presses. The resulting increase in the capacity of the carbide lime presses allows the generation of carbide lime at a quality level either higher or guaranteed to remain at the same level. In carrying out the method according to the invention, a carbide lime can be produced, which presents a guaranteed CaO content of at least 30 g/100 g (DM) respectively at least 21 g/100 g carbide lime. Here, the values were as follows $W_{DM}=70\%$ and $W_Z=0.7\%$. Per 100 kg beets used, a maximum of only approximately 2 kg or less carbide lime is produced. The maximum sugar loss is approximately 0.015 kg/100 g beets or less.

The fraction of non-sucrose substances separated in the first separation device surprisingly has a particularly high protein content, and it is accordingly also called "protein fraction." This protein fraction can be used advantageously as a process aid in the drying installation for beet chips, which is routinely provided in sugar beet processing, particularly to reduce the TOC, $SO_2$ emissions, and the energy consumption in the chip drying installation. In the first separation device, an protein-containing fraction in a quantity of at least approximately 0.4 kg (DM) per 100 kg can be obtained advantageously.

In known extract purification methods, the lowering of the lime consumption is limited by the worsening of the filterability, among other factors. It was found surprisingly that this limitation can be overcome by the method according to the invention. The only factor limiting the further reduction of the lime consumption is the thermostability of the limed thin juice.

In connection with the present invention, the term "crude sugar beet juice" denotes the juice extracted preferably from chips, preferably by counter-current extraction and preferably at 65-75° C., in the so-called diffusion method. This sugar-rich crude sugar beet juice also contains, besides sugar, different organic and inorganic components of beet, which are called non-sucrose substances or non-sugar substances.

In connection with the present invention, the term "non-sucrose substances," as contained in the crude sugar beet juice, denotes primarily high molecular weight substances, such as proteins, polysaccharides and cell wall components as well as low molecular weight organic compounds, such as inorganic or organic acids, amino acids and mineral substances. The cell wall components are particularly pectins, lignin, cellulose and hemicellulose. These substances, like the proteins, which comprise besides proteins particularly nucleoproteins, are present as hydrophilic macromolecules in a colloidal dispersed form. The organic acids are particularly lactate, citrate, and oxalate. The inorganic acids are particularly sulfates and phosphates.

The term "lime milk" denotes, according to the invention, particularly calcium hydroxide, which is formed by the strongly exothermic reaction of quicklime (calcium oxide) with water, and is used as calcification agent in the preliming and mainliming. The addition of lime milk to the crude sugar beet juice in the preliming effects the precipitation or coagulation of non-sucrose substances in the form of a coagulate.

The addition of lime milk for the preliming of the crude sugar beet juice occurs, according to the invention, preferably as a progressive preliming. The progressive preliming by a gradual increase in the alkalinity, respectively the pH, of the crude sugar beet juice, occurs preferably by the slow addition of lime milk calcification agent or by small interrupted individual additions of lime milk, where it is of particular importance to move slowly through the optimal pH. The advantages of the progressive preliming include an improvement of the filtration properties of the treated juice, a brighter thick juice color, and the avoidance of excess alkalinization. In addition, the progressive preliming allows a continuous work procedure.

The invention also provides for the possibility of carrying out the progressive alkalinization of the crude sugar beet juice during the preliming in countercurrent by an already alkalinized crude sugar beet juice, for example, by means of the sludge juice concentrate from the carbonation steps and/or crude juice that has been subjected to the mainliming. Progressive alkalinization in countercurrent means that the returned juice of higher alkalinity is mixed as rapidly as possible with the juice of lower alkalinity, without the possibility of any build up of different alkalinity gradients within the mixture zone. Using appropriate transport systems in the preliming apparatus, one ensures within the system that the required returned quantity is directed with high constancy against the main direction of flow.

In a preferred embodiment of the invention, step (a) occurs in a (first) alkalinization container. It is preferred for step (b) to take place in a (second) alkalinization container. The invention preferably provides for carrying out the preliming and the first mainliming in separate containers. Accordingly, the crude juice to be purified is prelimed first in step (a) in a first alkalinization container; and then it is brought into a second alkalinization container, separate from and connected after the first alkalinization container, to carry out the first mainliming in step (b). In an additional variant, the preliming is carried out in step (a), and the first mainliming in step (b), in the same alkalinization container, but one after the other with temporal delay, where, first, the preliming is carried out and then, in the same container, the first calcification is carried out. The beginning of the first mainliming is characterized particularly in that, due to the supplemental addition of lime milk, the preliming alkalinity is increased further until the alkalinity according to the invention of the first mainliming is reached.

In a preferred embodiment, the first separation device is designed in such a way that, in step (c), a longer residence time of the crude juice in the separation device is possible. It is preferred for the first separation device to be a decanter, particularly a static or dynamic decanter. It is understood that any other known separation device can also be used that allows a separation of the fraction of non-sucrose substances and the residence time according to the invention.

The terms "static decanting device" and "static decanter" denote a device or an apparatus which serves to mechanically remove sedimented substances from a fluid according to the principle of gravity-assisted sedimentation. It is preferred that using the decanter, the non-sucrose substances that precipitate or flocculate after the preliming are separated from the limed crude juice in such a manner that one part by volume foam deposits at the underflow of the decanter with respect to approximately four parts by volume of limed crude juice. At the time of the return of the sludge juice concentrate from the carbonation steps into the preliming, the invention provides for the separation, using the decanter, of the non-sucrose substances that precipitate or flocculate after the preliming, from the limed crude juice, in such a way that in the underflow of the decanter, one part by volume sludge for approximately nine parts by volume limed crude juice is deposited.

In a preferred embodiment, the non-sucrose substances, respectively the non-sucrose substance containing fraction, which were/was separated in step (c), is/are concentrated further to a so-called thin sludge. In the process, in at least one additional step (c3), in a second or additional separation device, a sucrose-containing fraction is separated therefrom, resulting in a further concentration of the non-sucrose substance containing fraction. As a second or additional separation device, it is preferred to use a centrifuge. The centrifuge is preferably chosen from dish centrifuges, respectively dish separators and decanter centrifuges. The second and additional separation devices are connected as desired immediately one after the other, i.e., the sludge outlet of a first additional separation device is connected with the inlet of a second additional separation device. However, it is also provided for the sludge outlet of a first additional separation device to be connected via a mixing container or a similar device to the inlet of a second additional separation device. It is preferred that the sucrose-containing clear juices respectively washed juices separated from the second and additional separation devices are returned again into the extract purification process according to the invention. The return is carried out preferably between a cold mainliming in step (b) and the residence in the first separation device in step (c).

The non-sucrose-containing fraction, concentrated further in at least one step (c3), also called concentrated "protein-containing fraction," is taken out of the extract purification process (step (c4)). In this way, a non-sucrose substance containing fraction made of crude sugar beet juice is produced.

In a preferred embodiment, the clear limed crude juice obtained in step (d) is led to a second mainliming of the carbonation. For this purpose, it is preferred to carry out, after step (d), in an additional, preferably immediately following step (e), at least one carbonation by introducing carbon dioxide into the mainliming juice. After the carbonation, a filtration of the sludge produced occurs. Here, a clear sucrose syrup is obtained. The carbonation takes place substantially in a known way.

The carbonation in step (e) is designed particularly advantageously as a two-step or multistep carbonation. It is preferred for a first carbonation to occur in step (e) and a first filtration in step (e1), and, preferably immediately thereafter a second carbonation and a second filtration in step (e2). After the second carbonation, a third and additional carbonation and filtration may follow, depending on the field of application and the purpose.

An additional object of the invention is a method for the manufacture of sucrose syrup from crude sugar beet juice. This method comprises, according to the invention, in a first step, the production of the crude sugar beet juice, preferably as obtained from the countercurrent extraction of sugar beet chips. Subsequently, the extract purification method according to the invention is carried out with at least steps (a) to (c) and preferably (d), as described above. Then, in an additional step, a clarified sucrose syrup is obtained that has been freed of non-sucrose substances. This syrup can be crystallized optionally in an additional step in a way which in itself is known, so that crystalline sucrose is obtained.

An additional object of the invention is a method for the preparation of a composition of non-sucrose substances, i.e., a non-sucrose substance containing fraction, also called protein-containing component, from crude sugar beet juice. This method comprises according to the invention, in a first step, the production of crude sugar beet juice. Then, at least steps (a) to (c) of the above-mentioned method according to the invention are carried out. The non-sucrose substance containing fraction is obtained preferably by additional concentration of the fraction by at least one of steps (c3). In an additional step, a separate, preferably further concentrated, non-sucrose substance containing composition is then obtained.

An additional object of the invention is also a method for the manufacture of carbide lime from crude sugar beet juice and lime milk. In a first step of the method according to the invention, a crude sugar beet juice is prepared. In a second step, the above-mentioned extract purification method including step (e) is carried out, where, in the carbonation and filtration, sludge is obtained; in an additional step, the sludge obtained is dewatered in a way which is known in itself, preferably by carbide lime pressing, so that substantially dry carbide lime is obtained. It is preferred to use a separation device, preferably a membrane filter press, for the dewatering of the sludge obtained in the carbonation and filtration, called "sludge juice." The membrane filter press is chosen preferably from frame filter presses and chamber filter presses. The latter are operated in a way which is known in itself. In the process, carbide lime is obtained that presents a dry matter content of at least 65%, especially 70% or more. It is particularly preferred to set the dry matter content to exactly 70%. The sugar content is preferably approximately 0.6-0.8%, preferably 0.7%. Advantageously, by the method according to the invention for the manufacture of carbide lime, the sugar loss in the purification of the crude sugar beet juice can be limited to approximately 0.015 kg/100 kg beets used.

Finally, another object of the invention is a device for carrying out the purification method according to the invention. The device contains at least a first alkalinization container (10), in which the preliming (step (a)) is carried out. The device according to the invention presents, furthermore, at least a second alkalinization container (20), in which the first mainliming (step (b)) is carried out. The device according to the invention presents furthermore a (first) separation device (30), in which the limed crude juice of the preliming and first mainliming is clarified, and a fraction of non-sucrose substances is separated from the limed crude juice. The device according to the invention presents preferably in addition at least a third alkalinization container (40), in which the second mainliming is carried out.

The first alkalinization container (10) presents at least an inlet (11) for the return of the crude sugar beet juice. It presents, moreover, at least a device (12) for the metering of lime milk. The latter device is designed in a way which in itself is known. In the simplest embodiment, the metering device is a nozzle with a controllable valve. Moreover, the first alkalinization container presents at least one outlet (13), through which the limed preliming juice can be removed.

The second alkalinization container (20) presents at least one inlet (21), through which the preliming juice can be led in the second alkalinization container. It is particularly preferred for the first and second alkalinization containers to be connected in such a way that the preliming juice flowing out of the outlet (13) of the first alkalinization container is transferred directly via the inlet (21) into the second alkalinization container. Furthermore, the second alkalinization container presents at least one device (22) for the metering of lime milk. Advantageously, the latter device is designed in accordance with the device (12) of the first alkalinization container. The second alkalinization container presents moreover at least one outlet (23), through which the limed crude juice can be removed after the first mainliming.

According to the invention, the separation device (30) presents at least one inlet (31) for the limed crude juice, and at least one inlet (33) for the clarified limed crude juice. It is preferred for the (first) separation device to be connected to the first and second alkalinization containers in such a way that the limed crude juice coming from the outlet (23) of the second alkalinization container can enter through the inlet (31) into the (first) separation device. This means that the inlet (31) connects to the outlet (23). It is preferred for the (first) separation device (30) to be operated at a high temperature of at least 70° C. or higher. In a preferred embodiment, the (first) separation device (30) is a static decanter.

The preferably provided third alkalinization container (40) contains at least one inlet (41), through which the clear limed crude juice, which leaves the (first) separation device, is introduced. The third alkalinization container is connected with the (first) separation device preferably in such a way that the clarified lime crude juice coming from the outlet (33) of the (first) separation device can enter the third alkalinization container through the inlet (41). This means that inlet (41) connects to the outlet (33) of the (first) separation device. Moreover, the third alkalinization container (40) presents preferably at least one device (42) for the metering of lime milk. Advantageously, the device (42) is designed like the device (12), respectively the device (22). Moreover, the third alkalinization container presents at least one outlet (43), through which the limed crude juice can be discharged after the completed second mainliming.

In a preferred embodiment, the device according to the invention presents at least one heat exchanger (50) for heating the crude juice limed in the preliming and first mainliming. It is preferred for the heat exchanger (60) to present at least one inlet (51) for the limed crude juice. The first and second alkalinization containers are connected with the heat exchanger preferably in such a way that the limed crude juice coming from the outlet (23) from the second alkalinization container can enter into the heat exchanger through the inlet (51), i.e., the outlet (23) of the second alkalinization container connects to the inlet (51). Moreover, the heat exchanger presents at least one outlet (52), through which the preheated limed crude juice is discharged. It is preferred for the heat exchanger (50) to be connected with the (first) separation device (30) in such a manner that the heated limed crude juice coming from the outlet (52) of the heat exchanger can enter into the inlet (31) of the (first) separation device, i.e., the outlet (52) connects to the inlet (31) of the (first) separation device.

In a preferred embodiment, the device according to the invention presents a heat exchanger (60) for heating the crude juice that was clarified in the first separation device prior to the entry into the second mainliming. The heat exchanger (60) presents preferably at least one inlet (61) for the clarified crude juice. The first separation device (30), the heat exchanger (60), and the third alkalinization container (40) are interconnected preferably in such a way that the clarified limed crude juice coming from the outlet (33) of the first separation device is heated via the heat exchanger (60), and then introduced into the third alkalinization container (40), so that a hot second mainliming can be carried out there.

The device according to the invention presents preferably at least a second or additional separation device (70). This second or additional separation device serves for further concentrating the non-sucrose-containing fraction, which was separated in the (first) separation device (30), where, from the non-sucrose substance containing fraction, a sucrose-containing fraction is again separated, which is preferably returned into the extract purification. Here, the second or additional separation device (70) presents at least one inlet (71) for the non-sucrose-containing fraction, at least one outlet (72) for the concentrated non-sucrose substance containing fraction, and at least one outlet (73) for a, preferably clear, saccharose-containing fraction, which has been separated therefrom. It is preferred for the inlet (71) to be in connection with the outlet (32) of the (first) separation device (30), so that the non-sucrose substance containing fraction coming from the outlet (32) can enter in the second or additional separation device (70). It is preferred to connect two or more additional separation devices (70) to be connected one after the other, i.e., in a cascade, so that an additional concentration of the non-sucrose-containing fraction can occur. The sucrose-containing fractions separated in each case here are returned, preferably in pooled form, through the corresponding outlet (73), and into the extract purification, preferably via mixing containers. It is preferred that at least one outlet (73) of the second or additional separation device (70) connects to the inlet (31) of the (first) separation device (30), so that the sucrose-containing fraction separated from the second or additional separation device (70), i.e., the clear juice or washed juice, can be returned to the (first) separation device (30). The sucrose-containing fraction is preferably led, prior to the return to the (first) separation device (30), through the preferably provided heat exchangers (50) before the entry into the separation device (30), so that the sucrose-containing fraction, i.e., the clear juice or washed juice, can be heated to the temperature according to the invention.

In a preferred embodiment, the second or additional separation device (70) is a centrifuge, preferably a decanter centrifuge.

The invention is explained in greater detail in the following examples, which should be considered nonlimiting.

Figure 1:
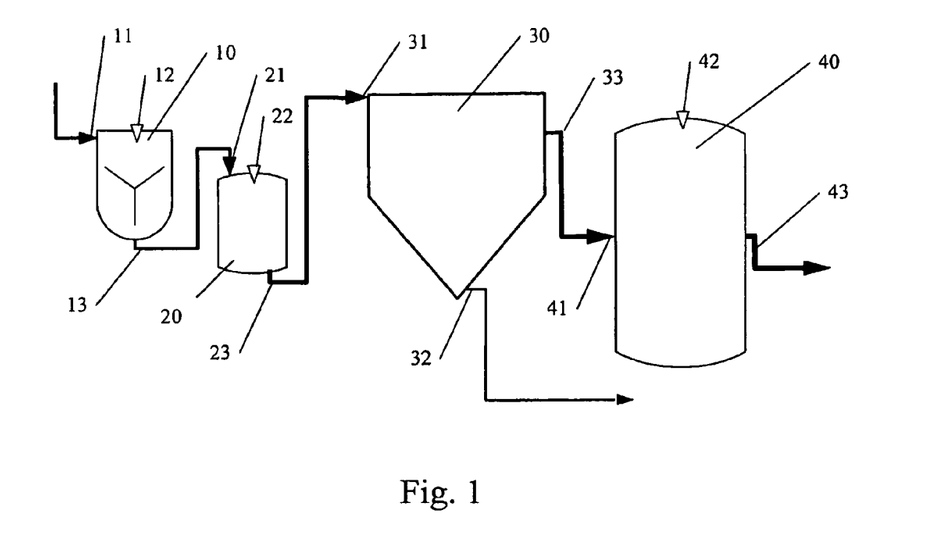

FIG. 1 shows the schematic structure of a preferred device according to the invention. The device presents a first alkalinization container (10) for the preliming with an inlet (11) for the crude juice, a metering device (12) for the metering of lime milk, and an outlet (13) for the limed preliming juice. Moreover, the device presents a second alkalinization container (20) for the first mainliming with an inlet (21) for the preliming juice of a metering device (22) for the metering of lime milk and an outlet (23) for the limed crude juice. Moreover, the device presents a separation device (30) for the clarification of the limed crude juice and separation of a non-sucrose substance containing fraction with an inlet (31) for the limed crude juice, an outlet (32) for the non-sucrose substance containing fraction, and an outlet (33) for the clarified limed crude juice. The device presents moreover a third alkalinization container (40) for the second mainliming for an inlet (41) for the clear limed crude juice, a metering device (42) for the metering of lime milk and an outlet (43) for the limed crude juice. According to the embodiment shown, the inlet (21) connects to the inlet (13) and the outlet (31) connects to the outlet (23) and the inlet (41) in connection with the outlet (33).

Figure 2:
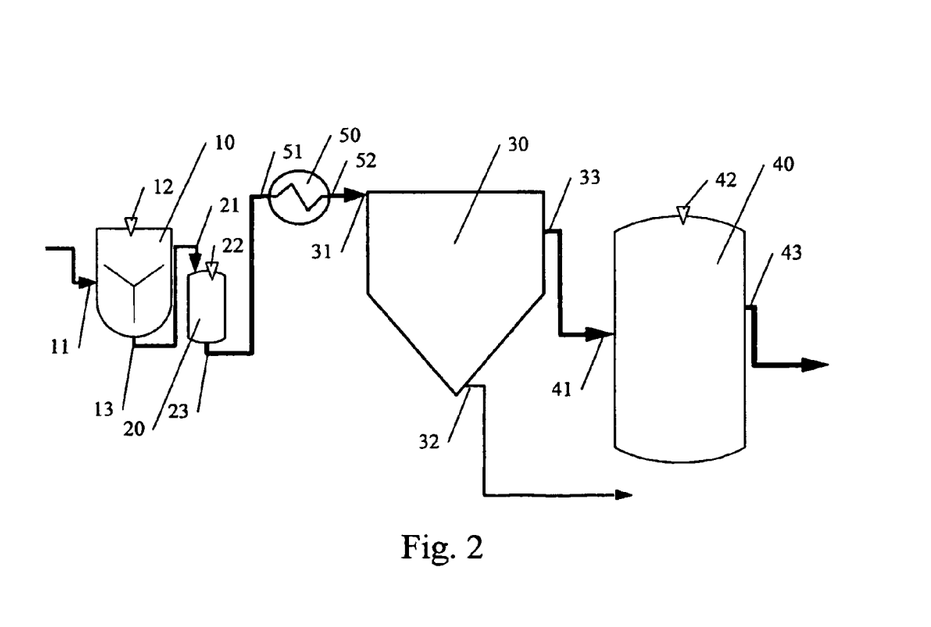

FIG. 2 shows an additional preferred embodiment of the device according to the invention. It contains additionally a heat exchanger (50) for heating the limed crude juice with an inlet (51) for the limed crude juice and an outlet (52) for the heated limed crude juice.

Figure 3:
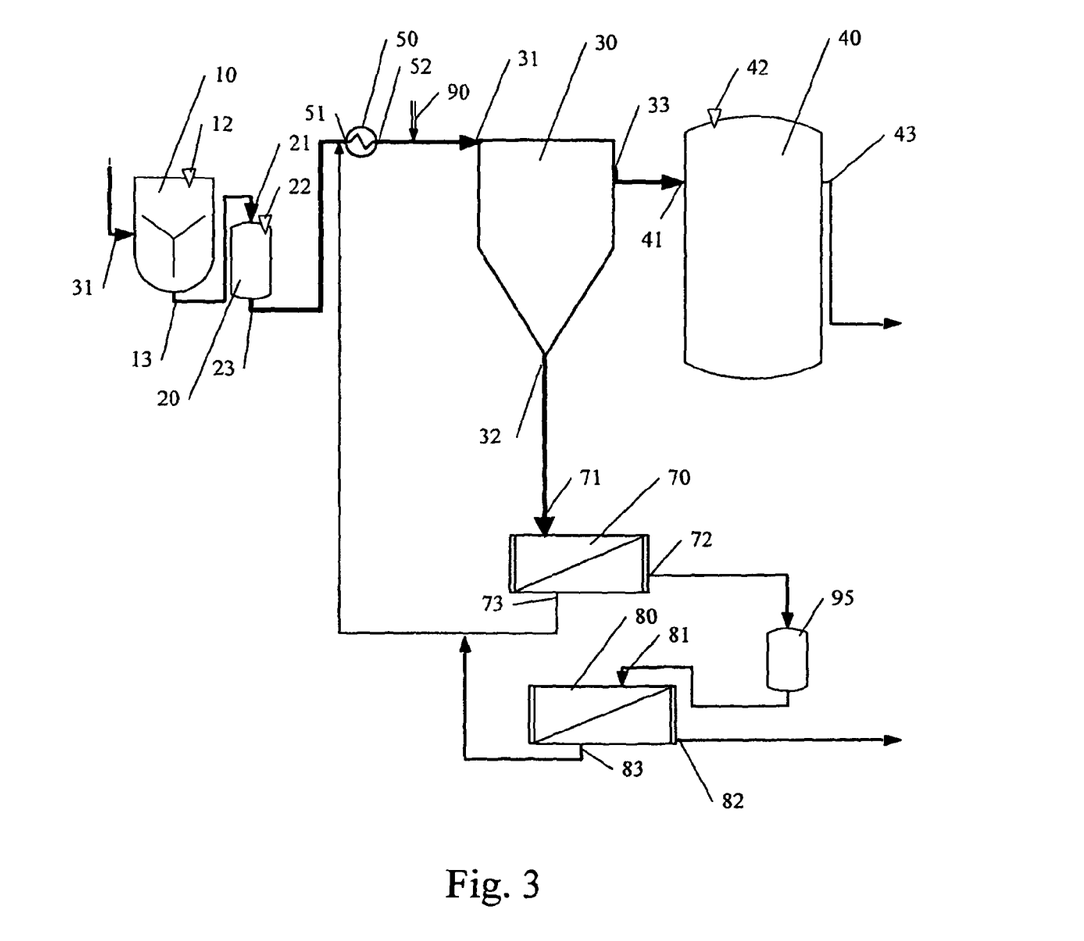

FIG. 3 shows an additional preferred embodiment of the device according to the invention. It contains additionally a second and additional separation device (70, 80) of the non-sucrose substance containing fraction, which comes from the first separation device (30). The second or additional separation device (70, 80) presents an inlet (71, 81) for the non-sucrose substance containing fraction, an outlet (72, 82) for the concentrated non-sucrose substance containing fraction and an outlet (73, 83) for a clear sucrose containing fraction. The first separation device (30) is represented, for example, as a decanter. In addition, the device presents a metering place for flocculation agents (90) and a mixing container (95).

Figure 4:
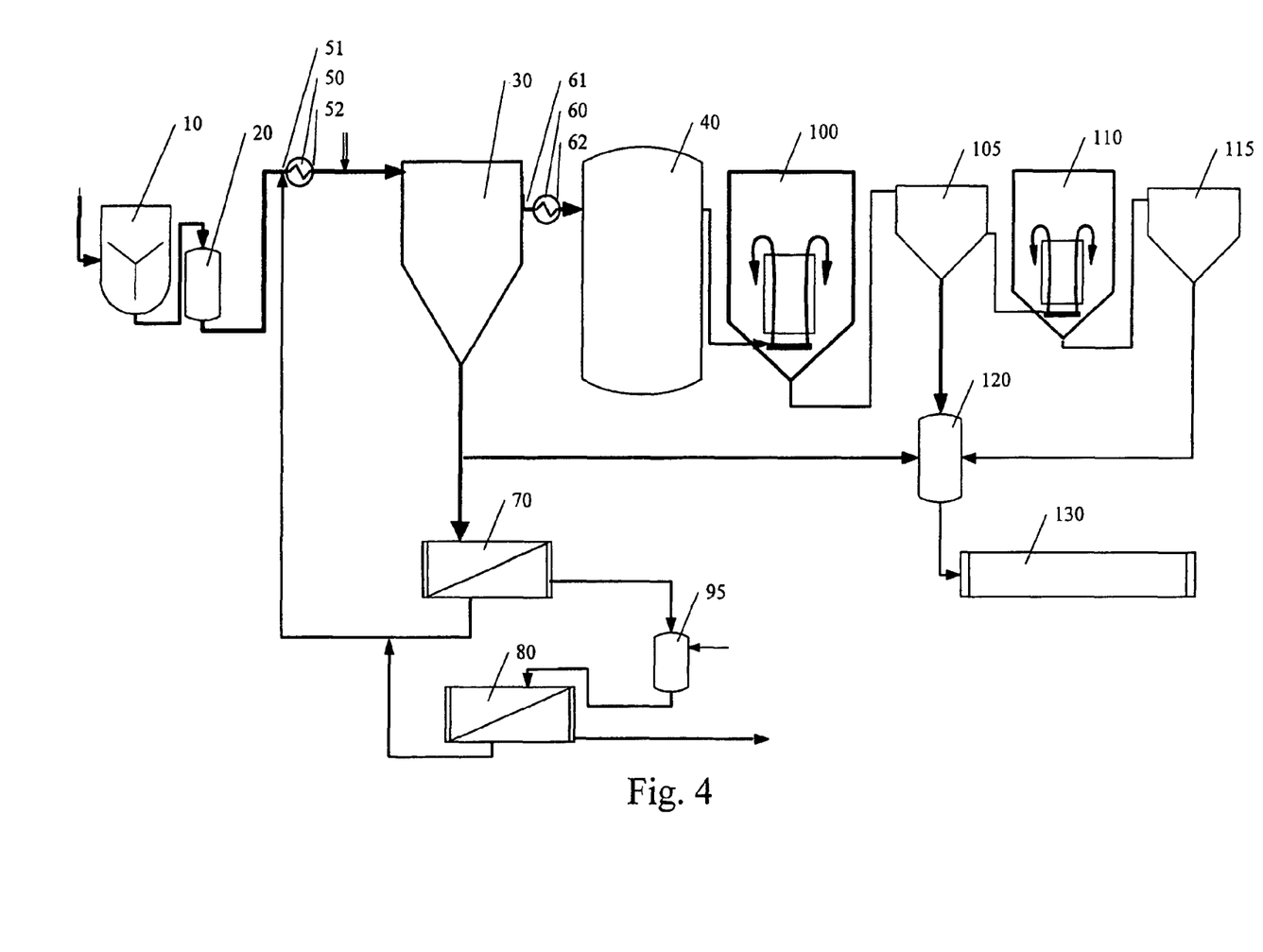

FIG. 4 shows the device according to the invention in connection with the technical implementation of the method according to the invention in a juice purification installation with heat exchangers (50, 60) with inlet (51, 61) for the clarified limed crude juice and outlet (52, 62) for the heated clarified limed crude juice, a first and second carbonation step (100, 110), first and second filtration step (105, 115), a sludge juice container (120), and a carbide lime press (130).

EXAMPLE 1

Extract Purification 1.1 Sugar Beet Extraction

Sugar beets, freshly harvested or stored for some time, are washed and then chopped up in a cutting machine with a cutting tool.

The chopped beet chips are led over a slurry container to a countercurrent extraction installation, and extracted in it. The temperature during the extraction is approximately 75° C. As extractor, a tower extractor is used, in which the chips are extracted in countercurrent with the heated fresh water. As extract, the so-called crude sugar beet juice is obtained.

1.2 Purification of Crude Sugar Beet Juice

For the purification of the crude sugar beet juice obtained in the extraction of the sugar beet chips, the crude juice is alkalinized in a first step in a preliming container by the addition of lime milk, i.e., it is prelimed. Then a sufficient quantity of lime milk is added the alkalinity is 0.2 g CaO/100 mL.

In connection with the preliming, a flocculation of non-sucrose substances by coagulation of the non-sucrose substances with each other and by precipitation by the added lime milk occurs. To support the sedimentation, a flocculation agent, for example, No. 2440, 2540 or 2540 TR (company Stockhausen) or AN 945 (company Clarflok) or Defofloc 26 CG (company Defotec) or Magnafloc LT 27, or a flocculation based on carboxymethylated starch, and prepared according to Example 2, is used optionally, for example. The proportion is 1-8 ppm.

After completion of the preliming, the prelimed crude juice is sent to an additional alkalinization container, which is connected downstream, to a first cold mainliming. For this purpose, by the further addition of lime milk, the alkalinity is increased to 0.4 g CaO/100 mL. The first mainliming occurs at temperatures of 75° C. or less.

The limed crude juice subjected to the preliming and the first mainliming is heated via a heat exchanger, connected downstream, to a temperature of approximately 75° C., and led into a static or dynamic decanter, in which it remains for 40-60 min. The decanter is also operated at a temperature of approximately 75° C. In the process, the flocculated non-sucrose substance containing fraction is separated and removed from the decanter as a thin sludge. The thin sludge is collected in a sludge container, and later led to a carbide lime press and/or separated from the clear juice, respectively the washed juice, a sucrose-containing fraction in a second and optionally additional separation device in the form of a decanter centrifuge. The clear juice and the washed juice is returned to the extract purification method, into the limed crude juice. The concentrated thin sludge obtained consists of the non-sucrose substance containing fraction.

Limed crude juice, which has been separated from the non-sucrose substance containing fraction, is obtained at the outlet of the decanter as a clear, or clarified, crude juice. The clarified crude juice is led through an additional heat exchanger and heated in the process to a temperature of approximately 85° C. The heated clarified crude juice is transferred into a third alkalinization container, the mainliming container, and subjected there to a hot, second mainliming. In the process, an alkalinity of 0.4 g CaO/100 mL is set. The temperature during the hot mainliming is approximately 85° C.

The mainliming juice that comes from the second mainliming is then subjected to a first carbonation with subsequent first filtration and, downstream to a second carbonation with subsequent second filtration. The carbonation is carried out by bubbling carbon dioxide gas into the mainliming juice, which results in the lime not used in the mainliming precipitating as calcium carbonate.

The precipitated calcium carbonate is removed after the first carbonation in the first filtration, or after the second carbonation in the second filtration, from the clarified crude juice, so that a clarified purified crude juice is obtained. The retentate obtained in the first and second filtration is pooled in a sludge container, and then dewatered with a carbide lime press.

1.3 Results

In carrying out this method, it is found that, in comparison to the known lime-carbonic acid extract purification method:
- the total lime consumption is reduced by more than 40% while the quality of the thin juice obtained remains the same,
- the coke consumption and the carbon dioxide emissions of the lime furnaces are reduced significantly, and
- the stress placed on the lime furnaces is reduced, which increases the effectiveness level, and decreases the stress put on the brick lining.

As a result of the reduced load of the first filtration, the useful lives of filters are increased for the filters connected after the first, respectively the second, carbonation.

The separated fraction of non-sucrose substances can be used as a processing agent for the chip drying installation to reduce the TOC and $SO_2$ emissions and the energy consumption in the chip drying installation.

This method works so efficiently that altered beets can also be used; as a result, the campaign time can be increased.

The sludge juice concentrate and the carbide lime quantity are reduced, resulting in a reduction of the stress on the carbide lime presses. The carbide lime produced has a dry matter content of approximately 70% and a sugar content of approximately 0.7%.

EXAMPLE 2

Manufacture of a Flocculation Agent Based on Starch

The flocculation agent is a coarsely ground, highly carboxymethylated potato starch. The carboxymethylation is carried out in the paste with sodium monochloroacetate (NaClOAc: Cl—$CH_2$—$COO^-Na^+$) under alkaline conditions. The carboxymethylation is carried out in two reaction steps, as a result of which a better conversion can also be reached.

The potato starch is stirred to a slurry with demineralized water, namely a 35% slurry, with the first quantity of sodium monochloroacetate, and agglutinated in the reactor with 50% NaOH. After increasing the temperature to 65° C., the reaction mixture is allowed to react for 1 h. Then, the addition of the second quantity of NaClAc, dissolved in water, is carried out, and the addition of the second sodium hydroxide solution quantity. After an additional hour of reaction time, the paste obtained is roller dried, and the starch film is ground. Because NaOH is consumed during the reaction, and to ensure the alkaline medium, one works in each case with a small molar excess of NaOH (1.07 fold quantity).

The product, in a 10% slurry prepared by stirring, presents a viscosity of 1000-2500 mPa·s, and the pH is approximately 10-11.5. The real degree of substitution (DS) is 0.6-0.7.

The invention claimed is:

1. Method for the purification of crude sugar beet juice, containing the steps:
   (a) preliming of the crude juice in a first alkalinization container to form a preliming juice;
   (b) immediately following said preliming, cold main liming the preliming juice in a second alkalinization container at a temperature lower than 75° C. to form a limed crude juice;
   (c) immediately following said cold main liming, clarification of the limed crude juice in a separation device at a temperature of 75° C. or higher, where the non-sucrose substance fraction is separated from the limed crude juice, and
   (d) hot mainliming the limed crude juice from which the non-sucrose fraction has been removed in a third alkalinization container at a temperature of 75° C. or higher.

2. Method according to claim 1, where, in step (a), the preliming is carried out by the addition of lime milk up to a concentration of 0.1-0.3 g CaO/100 mL.

3. Method according to claim 1, where, in step (b), the cold mainliming is carried out by the addition of lime milk to realize a concentration of 0.3-0.5 g CaO/100 mL.

4. Method according to claim 1, where, in step (c), the residence time of the limed crude juice in the separation device is 40 min or more.

5. Method according to claim 1, where, in step (a), the preliming is carried out at a temperature lower than 75° C.

6. Method according to claim 1, where the clarification is done by static or dynamic decanter.

7. Method according to claim 1, where the separated non-sucrose substance fraction is concentrated as a thin sludge in at least one additional step in an additional separation device by the separation of a sucrose fraction.

8. Method according to claim 7, where the additional separation device contains at least one decanter centrifuge.

9. Method according to claim 7, where the sucrose fraction obtained is returned as a clear juice and/or an washed juice into the separation device of step (c).

10. Method according to claim 9, where, in step (d), the hot mainliming is carried out by the addition of lime milk to realize a concentration of 0.4-0.7g CaO/100 mL.

11. Method according to claim 1, where, after step (d), in an additional step (e), at least one carbonation occurs by introducing carbon dioxide into the mainliming juice and subsequent filtration of the sludge produced, so that a clear sucrose syrup is obtained.

12. Method according to claim 11, where step (e) comprises a first carbonation and filtration, and a subsequent second carbonation and filtration.

13. Method for the manufacture of sucrose syrup from crude sugar beet juice, comprising:
   the production of crude sugar beet juice;
   the carrying out of the purification method according to claim 1; and
   the obtention of a sucrose syrup from which non-sucrose substances have been removed.

14. Method for the isolation of a combination of non-sucrose substances from crude sugar beet juice, comprising:
   the preparation of crude sugar beet juice;
   the carrying out of the method according to claim 1; and the obtention of the separated non-sucrose substance containing combination.

15. Method for the manufacture of a carbide lime from crude sugar beet juice and lime milk, comprising:
the preparation of crude sugar beet juice;
the carrying out of the method according to claim 11;
the dewatering of the sludge obtained in step (e) in the carbonation and filtration; and
the obtention of carbide lime.

16. Method for the purification of crude sugar beet juice, containing the steps:
(a) preliming of the crude juice in a first alkalinization container to form a preliming juice;
(b) immediately following said preliming, cold main liming the preliming juice in a second alkalinization container at a temperature lower than 75° C. to form a limed crude juice;
(c) after the cold mainliming in step (b) and before the clarification of the limed crude juice in step (d), adding at least one flocculation agent to realize a concentration of 1-8 ppm;
(d) immediately following said cold main liming and addition of flocculation agent pursuant to step (c), clarification of the limed crude juice in a separation device at a temperature of 75° C. or higher, wherein the non-sucrose substance fraction is separated from the limed crude juice, and
(e) hot mainliming the limed crude juice from which the non-sucrose fraction has been removed in a third alkalinization container at a temperature of 75° C. or higher.

17. Method according to claim 16, where the flocculation agent is a copolymer containing acrylamide and sodium acrylate, and presents an average molecular weight of $5 \times 10^6$ to $22 \times 10^6$ g/mol.

18. Method according to claim 16, where the flocculation agent is chosen from carboxymethylcellulose, carboxymethyl starch, and mixtures thereof.

* * * * *